(12) United States Patent
Letailleur et al.

(10) Patent No.: US 9,752,031 B2
(45) Date of Patent: Sep. 5, 2017

(54) TUBE MADE OF HYDROPHILIZED SILICONE

(71) Applicant: Saint-Gobain Performance Plastics France, Charny (FR)

(72) Inventors: Alban Letailleur, Paris (FR); Boris Jaffrennou, Paris (FR); Christophe Le Baron, Montargis (FR)

(73) Assignee: SAINT-GOBAIN PERFORMANCE PLASTICS FRANCE, Charny Orée de Puisaye (FR)

( * ) Notice: Subject to any disclaimer, the term of this patent is extended or adjusted under 35 U.S.C. 154(b) by 409 days.

(21) Appl. No.: 14/508,624

(22) Filed: Oct. 7, 2014

(65) Prior Publication Data
US 2015/0099079 A1  Apr. 9, 2015

(30) Foreign Application Priority Data

Oct. 7, 2013 (FR) ..................... 13 59708

(51) Int. Cl.
| | | |
|---|---|---|
| C08L 83/04 | (2006.01) | |
| A47J 31/46 | (2006.01) | |
| B29C 47/88 | (2006.01) | |
| B29C 47/92 | (2006.01) | |
| B29C 47/00 | (2006.01) | |
| B29K 83/00 | (2006.01) | |
| B29K 105/00 | (2006.01) | |
| B29L 23/00 | (2006.01) | |
| C08G 77/20 | (2006.01) | |
| C08G 77/46 | (2006.01) | |
| F16L 11/04 | (2006.01) | |

(52) U.S. Cl.
CPC .............. *C08L 83/04* (2013.01); *A47J 31/46* (2013.01); *B29C 47/0023* (2013.01); *B29C 47/0026* (2013.01); *B29C 47/0066* (2013.01); *B29C 47/881* (2013.01); *B29C 47/8805* (2013.01); *B29C 47/92* (2013.01); *B29C 47/0004* (2013.01); *B29C 2947/92704* (2013.01); *B29K 2083/00* (2013.01); *B29K 2105/0088* (2013.01); *B29L 2023/005* (2013.01); *C08G 77/20* (2013.01); *C08G 77/46* (2013.01); *C08L 2205/02* (2013.01); *F16L 11/04* (2013.01); *Y10T 428/139* (2015.01)

(58) Field of Classification Search
CPC .. C08L 83/04; C08L 2205/02; B29C 47/0004; B29C 47/0026; B29C 47/0023; B29C 47/0066; B29C 47/881; B29C 47/92; B29C 2947/92704; B29C 47/8805; B29K 2083/00; B29K 2105/0088; B29L 2023/005; Y10T 428/139; C08G 77/20; C08G 77/46; A47J 31/46; F16L 11/04
See application file for complete search history.

(56) References Cited

U.S. PATENT DOCUMENTS

| | | |
|---|---|---|
| 4,144,206 A | 3/1979 | Symeon |
| 4,248,750 A | 2/1981 | Murakami et al. |
| 4,600,751 A | 7/1986 | Lee et al. |
| 8,053,548 B2 | 11/2011 | Dhruv et al. |
| 8,217,113 B2 | 7/2012 | Scheim et al. |
| 8,921,492 B2 | 12/2014 | Jennrich et al. |
| 8,968,627 B2 | 3/2015 | Irmer et al. |

FOREIGN PATENT DOCUMENTS

| | | |
|---|---|---|
| EP | 2143766 A1 | 1/2010 |
| FR | 2429810 A1 | 1/1980 |
| JP | S62-015584 B | 4/1987 |
| JP | H02-209911 A | 8/1990 |
| JP | 2004-315571 A | 11/2004 |
| JP | 2006-169537 A | 6/2006 |
| JP | 2010-535872 A | 11/2010 |
| JP | 2011-514926 A | 5/2011 |
| JP | 2012-180526 A | 9/2012 |
| JP | 2012-219165 A | 11/2012 |
| KR | 201000057835 A | 6/2010 |
| WO | 2010140009 A1 | 12/2010 |
| WO | 2013148979 A1 | 10/2013 |
| WO | 2015052126 A1 | 4/2015 |

OTHER PUBLICATIONS

International Search Report from PCT/EP2014/071330 dated Oct. 24, 2014 (4 pgs).
Yao et al., "Hydrophilic PEO-PDMS for microfluidic applications," Journal of Micromechanics and Microengineering, vol. 22, No. 2, Jan. 20, 2012 (7 pgs).

*Primary Examiner* — Michael C Miggins
(74) *Attorney, Agent, or Firm* — Abel Law Group, LLP; Chi Suk Kim

(57) ABSTRACT

The invention relates to a process for the production of a piece made of silicone including: (a) the blending of 100 parts by weight of an HCR silicone base having a viscosity of greater than $10^6$ mPa·s with from 0.3 to 7 parts by weight, such as from 0.5 to 5 parts by weight, of an amphiphilic copolymer including hydrophobic polydiorganosiloxane blocks and hydrophilic poly(ethylene oxide), poly(propylene oxide) or ethylene oxide and propylene oxide copolymer blocks, until a homogeneous blend of HCR base and amphiphilic copolymer is obtained, (b) the shaping of the homogeneous blend obtained, and (c) the curing of the shaped blend by heating or irradiation. It also relates to a piece, in particular a tube, manufactured according to this process and to a device comprising such a tube.

17 Claims, No Drawings

TUBE MADE OF HYDROPHILIZED SILICONE

CROSS-REFERENCE TO RELATED APPLICATION(S)

The following disclosure is a non-provisional application that claims priority to French Application No. 1359708 filed Oct. 7, 2013, entitled "Silicone with Low Fouling Properties" by Alban Letailleur et al., which is incorporated herein by reference in its entirety.

FIELD OF THE DISCLOSURE

The present invention relates to a novel process for the manufacture of pieces, in particular of tubes, made of hydrophilized silicone starting from a heat-curable HCR (High Consistency Rubber) silicone base. It also relates to the pieces obtained by this process and to their use in reducing the adsorption of proteins and/or the growth of microorganisms in liquid transportation systems.

BACKGROUND

Drink dispensers, in particular automatic coffee machines, include tubes for transporting hot or cold liquid foods. It is known to use, for these tubes, silicones or polyorganosiloxanes, a material which is distinguished by its longevity, its flexibility, its relatively limited cost, its high chemical inertia and its good resistance to high and low temperatures.

However, polyorganosiloxanes exhibit the disadvantage of being hydrophobic, which presents a problem when it is desired to use them for tubes intended to transport liquids which include proteins, such as milk.

When proteins, in suspension or in solution in an aqueous liquid, come into contact with a hydrophobic surface, they are adsorbed, often irreversibly, and are difficult, indeed even impossible, to remove by simple rinsing. The fouling of the tubes by protein films presents problems of a detrimental change in the taste and of bacterial proliferation.

It is known to reduce the hydrophobic nature of liquid silicones (LSRs) by incorporation of polydimethylsiloxane-poly(ethylene glycol) (PDMS-PEG or PDMS-PEO) copolymers, in particular with the aim of limiting or preventing the adsorption of proteins and the fouling which ensues.

U.S. Pat. No. 8,053,548, for example, describes the preparation of hydrophilic silicones by mixing a PDMS base, a crosslinking agent and amphiphilic PDMS-PEO block copolymers. Figure 3 shows the decrease in the contact angle as a function of the amount of amphiphilic copolymer added.

The paper entitled "Hydrophilic PEO-PDMS for microfluidic applications" by Yao et al. also describes the preparation of PDMS sheets, the surface of which has been rendered hydrophilic by incorporation of an amphiphilic PDMS-PEO block copolymer.

In both cases, the silicone base used is of liquid (LSR) type. Specifically, silicones which cure at high temperature (HTV, High Temperature Vulcanizing) are conventionally divided into two categories:

LSRs (Liquid Silicone Rubbers) are more or less fluid elastomer bases which flow freely or at least can be pumped. They are sold in the form of two-component kits including an elastomer base formed by monomers or prepolymers of low molecular weight and of a reinforcing filler (component A) and a curing catalyst, generally platinum-based (component B), which catalyzes a hydrosilylation reaction between a vinyl functional group and a hydrosilyl functional group. LSRs are conventionally used for the injection moulding of complex pieces.

HCRs (High Consistency Rubbers), on the other hand, are elastomer bases of very high viscosity, generally of greater than $10^6$ mPa·s. They are generally sold in the form of single-component compositions including a polyorganosiloxane of high weight including vinyl groups, a reinforcing filler and a curing agent (peroxide). The heating or the irradiation of the composition triggers the decomposition of the curing agent (radical initiator or photoinitiator) and the polymerization of the vinyl groups.

However, there also exist two-component HCRs which cure by platinum-catalyzed hydrosilylation.

In the two documents of the state of the art mentioned above, the elastomer bases are of two-component LSR type. The weakly to moderately viscous nature of these resins allows the amphiphilic copolymer to migrate, before crosslinking, towards the surface of the piece where the molecules become oriented so that their hydrophilic part is turned towards the surface, while the PDMS part becomes anchored in the body of the PDMS base. A period of venting of several tens of minutes, indeed even of several hours, is thus provided in the two abovementioned documents in order to allow the hydrophilizing surfactant to accumulate at the surface of the composition.

Unfortunately, such liquid bases are not appropriate for the extrusion of silicone tubes or profiled elements. This is because the low viscosity of the LSRs makes difficult the shaping by extrusion of tubes or profiled elements which are sufficiently rigid to retain their shape up to the crosslinking stage.

Furthermore, in the two abovementioned documents of the state of the art, the LSR mixture, once vented, is cured at a temperature of the order of 60° C. to 80° C. for more than one hour. Such a long heating at a relatively low temperature is not appropriate either for an extrusion process.

To the knowledge of the Applicant Company, the incorporation of amphiphilic copolymers of PDMS-PEO type in HCRs, for the purpose of an extrusion process, has until now never been described.

This is because a person skilled in the art could assume that the virtually solid consistency of such elastomer bases would prevent the migration of the copolymers towards the surface of the extruded tubes and that the amounts of amphiphilic copolymer necessary in order to obtain a significant hydrophilizing effect would for this reason be very high.

In point of fact, the incorporation of high amounts, for example of more than 5% by weight, of amphiphilic copolymer is not desirable for the following reasons:

it might result in an increase in the production cost of the pieces produced;

a deterioration in the mechanical properties of the finished pieces might result therefrom, for example a decrease in the Young's modulus and in the elongation at break;

the duration of the crosslinking stage would be extended, which, at high temperatures (>200° C.) often necessary in the context of an extrusion process, might present problems of chemical decomposition of the hydrophilic part of the amphiphilic copolymer and might greatly reduce the overall speed of the production line.

SUMMARY

A process for the production of a piece made of silicone includes the blending of 100 parts by weight of an HCR silicone base having a viscosity of greater than $10^6$ mPa·s with from 0.3 to 7 parts by weight, such as from 0.5 to 5 parts by weight, or even from 2 to 5 parts by weight of an amphiphilic copolymer including hydrophobic polydiorganosiloxane blocks and hydrophilic poly(ethylene oxide), poly(propylene oxide) or ethylene oxide and propylene oxide copolymer blocks, until a homogeneous blend of HCR base and amphiphilic copolymer is obtained, the shaping of the homogeneous blend obtained, and the curing of the shaped blend.

DETAILED DESCRIPTION

On undertaking research studies targeted at incorporating PDMS-PEG copolymers in silicones of HCR type for the purpose of an extrusion process, the Applicant Company found with surprise that, contrary to what was believed by a person skilled in the art, the adsorption of proteins on silicone tubes manufactured from HCRs might be very efficiently reduced with fairly limited amounts of PDMS-PEG surfactants. The use of concentrations of PDMS-PEG of the order of 0.5% to 3% only in HCRs made it possible, in all cases, to spectacularly reduce the amount of proteins adsorbed, this being the case not only for materials exhibiting low contact angles of less than 50° but also for relatively hydrophobic materials exhibiting higher contact angles of the order of 70°, indeed even of greater than 90°.

The present invention is thus based on the rather surprising discovery that it is possible to reduce, indeed even to suppress, the adsorption of proteins on silicone elastomers manufactured from HCR bases by incorporation of fairly small amounts of a PDMS-PEG copolymer in an HCR base until a homogeneous blend is obtained, followed by forming and rapid curing of the blend. The amount of proteins which is adsorbed on such a hydrophilized elastomer is reduced by more than 70%, indeed even by more than 90%, with respect to an identical material devoid of PDMS-PEG, even in the context of a manufacturing process where no migration of the PDMS-PEG molecules towards the surface is a priori possible, such as, for example, in an extrusion process.

A subject-matter of the invention is a process for the production of a piece made of silicone including:

the blending of 100 parts by weight of an HCR silicone base having a viscosity of greater than $10^6$ mPa·s with from 0.3 to 7 parts by weight, such as 0.5 to 5 parts by weight or even from 1 to 3 parts by weight of an amphiphilic copolymer including hydrophobic polydiorganosiloxane blocks and hydrophilic poly(ethylene oxide), poly(propylene oxide) or ethylene oxide and propylene oxide copolymer blocks, until a homogeneous blend of HCR base and amphiphilic copolymer is obtained, the shaping of the homogeneous blend obtained, and the curing of the shaped blend, such as by heating at a temperature of between 120° C. and 225° C., such as between 150° C. and 200° C., by irradiation with an appropriate electromagnetic radiation (photocrosslinking), or combination thereof.

The acronym HCR means, in the field of the silicones, either High Consistency Rubber or Heat Curable Rubber and denotes, in the present patent application, an elastomer base which is a blend of a polydiorganosiloxane rubber and of at least one reinforcing filler, generally fumed silica. The molecular weight of the rubber and the fraction of the reinforcing filler are such that the viscosity of the base, measured at ambient temperature (25° C.), is greater than $10^6$ mPa·s. In other words, the HCR base is too viscous to be poured or pumped but can, on the other hand, be cut, kneaded, ground and/or calendered.

An HCR base used in the present invention generally includes, per 100 parts by weight of polydiorganosiloxane rubber, from 10 to 50 parts by weight of fumed silica, optionally from 5 to 20 parts of precipitated silica and optionally from 10 to 100 parts of a diluting/bulking filler.

In a particular embodiment, the polydiorganosiloxane rubber is a polydimethylsiloxane including vinyl groups (VMQ). These vinyl groups, located at the chain end or inserted randomly along the macromolecular chain, constitute crosslinking points.

This crosslinking of the HCRs involving the vinyl groups of the VMQ rubbers can be carried out by a radical mechanism. A radical initiator, generally a symmetrical aroyl or alkyl peroxide, incorporated in the HCR base undergoes splitting, by thermal or photochemical decomposition, into two radicals and initiates, in a known way, the reaction of the vinyl groups with one another or with Si—$CH_3$ groups. In the field of the silicones, specific initiators of the vinyl groups (alkyl peroxides), which initiate only the reaction between vinyl groups, and non-specific initiators (aroyl peroxides), which also initiate the reaction between vinyl groups and Si—$CH_3$ groups, are singled out.

As each thermal initiator is characterized by a decomposition temperature range specific to it, it is advisable to choose the initiator as a function of the crosslinking temperature envisaged.

From the viewpoint of an extrusion process, followed by a short crosslinking stage, the crosslinking temperature has to be high and alkyl peroxides, specific for the vinyl groups, such as dicumyl peroxide (DCP), di(tert-butylperoxyisopropyl)benzene, 2,5-di(tert-butylperoxy)-2,5-dimethylhexane (DBPH) and di(tert-butyl) peroxide, which exhibit higher decomposition temperatures than those of aroyl peroxides, will typically be chosen.

When the curing is carried out by photocrosslinking, the initiator is chosen from conventional photoinitiators, the best known being AIBN and the benzoyl peroxide. A person skilled in the art will know how to choose the dose and the wavelength of the appropriate electromagnetic radiation as a function of the initiator chosen. This radiation is generally actinic light or UV radiation, such as UV radiation.

The crosslinking of the HCRs can also be carried out by a hydrosilylation reaction catalyzed by platinum. The crosslinking is typically carried out in the presence of a crosslinking agent including at least two hydrosilyl (—Si—H) groups. As the hydrosilylation reaction is carried out at ambient temperature, the catalyst (platinum) is normally stored separately from the VMQ/crosslinking agent reactive pair, added shortly before the shaping. In some cases, inhibitors are used to delay the crosslinking. In a known way, the platinum is generally stored in the form of a masterbatch with the VMQ rubber (component B) which is incorporated in a VMQ/crosslinking agent mixture (component A). The HCR bases curable by hydrosilylation are thus generally bases including two components.

The catalyst can be activatable by heat or can be chosen from known photoactivatable catalysts, such as the photoactive platinum compounds described, for example, in U.S. Pat. No. 6,451,869.

To sum up, the HCR silicone base is typically:

a single-component base including a polydimethylsiloxane having vinyl groups (VMQ) and a peroxide, such as an alkyl peroxide, or a two-component base including a polydimethylsiloxane having vinyl groups (VMQ), a crosslinking agent having hydrosilyl groups and platinum as catalyst, the platinum being stored separately from the crosslinking agent.

In an exemplary embodiment, from the viewpoint of the manufacture of silicone tubes for food contact by extrusion, use will be made of a two-component HCR base because by-products such as the decomposition products of the peroxide initiators can be formed in the single-component bases. These by-products are small-sized molecules which are relatively volatile and can for this reason easily migrate and be released into the liquid medium with which they come into contact, which is particularly troublesome when this liquid participates in the composition of a foodstuff. This is the reason why products produced from single-component bases are exposed to post-treatments, generally at high temperature and for fairly long periods of time to prevent the migration of such small-sized molecules.

Tests carried out by the Applicant have further demonstrated that use of a catalyst system based on platinum for the HCR resulted in hydrophilic silicone based elastomers having advantageous mechanical properties, such as more rigid pieces having higher shear modulus and tensile strength compared to a peroxide based catalyst system.

The below table shows the shear modulus (G') of silicone elastomers obtained from an HCR base having a Shore A hardness of 60 containing increasing amounts of amphiphilic copolymer, cured by means of a platinum-based catalyst or of a peroxide based catalyst.

One can see that in the absence of amphiphilic copolymer the shear modulus is about 20% higher for the platinum-cured elastomer than for the peroxide-cured product. It decreases with increasing amount of copolymer incorporated. The decrease is however much more limited for platinum-cured elastomers (50% of shear modulus loss at 5% copolymer) than for peroxide-cured elastomers (about 90% of shear modulus loss at 5% copolymer).

|  | Platinum-cured elastomer | Peroxide-cured elastomer |
| --- | --- | --- |
| 0% amphiphilic copolymer | 1.2 MPa | 0.97 MPa |
| 1% amphiphilic copolymer | 1.0 MPa | 0.30 MPa |
| 2% amphiphilic copolymer | 0.76 MPa | 0.22 MPa |
| 3% amphiphilic copolymer | 0.65 MPa | 0.17 MPa |
| 4% amphiphilic copolymer | 0.60 | 0.14 MPa |
| 5% amphiphilic copolymer | 0.60 | 0.13 MPa |

Mention may be made, as examples of commercially available single-component HCR bases, of the products sold by Wacker under the name Elastosil®R, by BlueStar under the name Bluesil® and by Momentive under the name Silplus®.

Exemplary commercially available two-component HCR bases which can be used for the extrusion of silicone tubes are sold by Wacker under the name Elastosil®Rplus, by BlueStar under the name Silbione® and by Momentive under the name Addisil®.

In a specific embodiment, the amphiphilic copolymer also includes, generally in its polydiorganosiloxane part, reactive groups capable of reacting with the HCR silicone base, such as vinyl, silanol, alkoxysilyl (hydrolyzable to give silanols) or hydrosilyl groups, or combinations thereof.

During stage (c) of the process of the present invention, the amphiphilic copolymer is then incorporated in the polymer network via covalent bonds, which prevents the leaching of this agent responsible for the hydrophilic nature and should, in an exemplary embodiment, considerably extend the duration of the hydrophilic functionality of the pieces.

The amphiphilic copolymer used in the present invention includes at least one hydrophobic block, such as a polydiorganosiloxane block, in a particular embodiment a PDMS block. In an embodiment, the PDMS block includes at least three dimethylsiloxane units and generally less than 200 dimethylsiloxane units, such as less than 100 dimethylsiloxane units. The amphiphilic copolymer additionally includes at least one hydrophilic block. In an embodiment, the hydrophilic block includes at least five ethylene oxide (EO) and/or propylene oxide (PO) units, such as from 6 to 60 and in a particular embodiment from 6 to 30 EO and/or PO units. When the amphiphilic copolymer includes several hydrophilic blocks or several hydrophobic blocks, the values indicated above are valid for each of the blocks.

In a particular embodiment, the amphiphilic copolymer is chosen from the group formed by: triblock copolymers of A-B-A structure where each A represents a poly(ethylene oxide) block and B represents a PDMS block, grafted copolymers including a single PDMS block to which several poly(ethylene oxide) blocks are grafted, and copolymers formed of a PDMS block including from 3 to 8 dimethylsiloxane units to which a single poly(ethylene oxide) block is grafted.

ABA triblock copolymers are available commercially, for example under the names CoatoSil 3500 (Momentive), Di-1010, Cr1115 and Di 5018F (Siltech). The molecular weight shown by the suppliers of these molecules is between 2000 and approximately 7000 g/mol.

Mention may be made, as grafted copolymers, of the products D212 CG and J1015-0-Ac from Siltech. Their molecular weight is between approximately 2000 and 25000 g/mol.

Finally, the companies Gelest, Dow Corning and Momentive respectively sell, under the names SiH6185.0, 500 W Additive and CoatOSil 077, a trisiloxane grafted with a single hydrophilic chain including from 6 to 9 ethylene oxide units.

The amount of amphiphilic copolymer added to and incorporated in the HCR base is between 0.3 and 7 parts by weight, such as between 0.5 and 5 parts by weight, such as between 0.6 and 3 parts by weight and or even between 0.7 and 2 parts by weight, per 100 parts by weight of HCR silicone base (including the silicone rubber, the reinforcing fillers and optionally the nonreinforcing fillers).

These amounts are equivalent to, indeed even lower than, those used conventionally for LSRs. As shown in the examples below, this is because the Applicant Company has found that, despite the use of a much more viscous silicone base and the absence of diffusion of the amphiphilic copolymer towards the surface, it was not necessary to increase the amounts of amphiphilic copolymer added.

The incorporation of the amphiphilic copolymer in the HCR base includes the vigorous blending of a relatively liquid component and of another component having a virtually solid consistency. In order to obtain a homogeneous blend of these two components, it is possible to use an open mill, an internal mixer or a conical twin-strew mixer.

It may in some cases prove to be useful to first prepare a masterbatch from a small amount of elastomer base and a large amount of amphiphilic copolymer. This masterbatch, concentrated in copolymer, is generally easy to incorporate in the remainder of the base.

When stage (b) of the process is an extrusion stage or includes an extrusion stage, the blending of the amphiphilic copolymer and of the HCR silicone base can be carried out before introduction into the extruder. When the HCR base is a two-component base, the blending of the two components A (reactants) and B (catalyst) will take place in principle during this same stage (a) of incorporation of the amphiphilic copolymer in the HCR base and typically before the introduction of the homogeneous blend into the extruder.

In order to prevent premature crosslinking of the blend in the extruder under the effect of the heat generated by the application of pressure, the extruder typically includes a cooling system which makes it possible to stabilize the temperature of the extruded composition for example in the 10-40° C. range, generally in the vicinity of 30° C.

As explained in the introduction, the use of HCR bases is particularly advantageous in the context of a process for the manufacture of profiled elements, such as of tubes, made of silicone. This is because, at the die outlet, the profiled elements should retain their shape and the material must not flow. In a particular embodiment of the process, stage (b) is consequently a stage of extrusion or includes a stage of extrusion of a profiled element, such as of a tube.

When, during the use of the profiled elements, not all their surfaces are exposed to liquids including proteins, it is possible to envisage the manufacture by coextrusion. This is the case, for example, with silicone tubes for drink dispensing machines, only the internal surface of which will come into contact with protein-comprising liquids, such as milk. It may then be advantageous from an economical viewpoint to coextrude a hydrophilized HCR base as defined above, forming the inside of the tube, with a different composition forming the outside of the tube.

In a particular embodiment of the process of the present invention, stage (b) is thus a stage of coextrusion of the homogeneous blend obtained in stage (a) with at least one other composition of an organic polymer, it being possible for this other composition to be thermoplastic or thermosetting.

The organic polymer is typically an elastomer, and in a particular embodiment, a silicone.

In order to guarantee good compatibility between the two layers and to prevent delamination, it is particularly advantageous to choose the coextruded organic polymer from heat-curable HCR silicone bases devoid of amphiphilic copolymer. In an exemplary embodiment, the HCR bases in the hydrophilized internal layer and the external layer are the same.

However, the present invention is not strictly limited to an extrusion process. This is because it can be advantageous to manufacture pieces, other than profiled elements, capable of coming into contact with liquids including proteins, for example pieces for connecting or fixing the tubes, by a moulding process, for example by compression moulding or by transfer moulding.

The heating stage (c) is carried out in known appliances, for example by radiative heating with radiation in the near infrared region or by convective heating with hot air. The duration of the heating stage (c) is typically between 1 and 30 minutes, such as between 2 and 15 minutes and or even between 3 and 10 minutes.

In one embodiment of the process according to the invention, the shaping stage (b) immediately precedes the crosslinking stage (c); in other words, no more than 2 minutes, in particular less than 1 minute and more particularly less than 30 seconds passes between the end of stage (b) and the beginning of stage (c).

When the shaping stage is carried out not by extrusion but by moulding, stages (b) and (c) can be carried out simultaneously, for example when the homogeneous blend is introduced into a mould preheated to the curing temperature.

When the HCR base used is a two-component base crosslinkable by hydrosilylation catalyzed by platinum, the postcuring stages may be much shorter, indeed even superfluous.

On the other hand, when the HCR base is a single-component base, postcuring may be carried out by heating at temperatures of between 160 and 210° C. for 2 to 24 hours.

Another subject-matter of the present invention is a piece made of cured silicone, obtainable by the process of the present invention.

The Applicant Company considers that the piece made of silicone manufactured according to the process of the present invention is novel with respect to the silicone pieces of the state of the art obtained from LSR silicone bases. This is because, as the process according to the invention typically does not make possible substantial migration of the amphiphilic copolymer molecules towards the surface of the piece, the said copolymer will be uniformly distributed in the body of the piece and will not be concentrated at the surface of the latter, as is the case for the pieces of the state of the art obtained by the crosslinking of significantly less viscous elastomer bases.

The silicone pieces obtained by the process of the present invention do not all exhibit a pronounced hydrophilic nature. The contact angle (sessile drop test) is for the majority of them of the order of 90-100°. All samples prepared exhibit however a considerably reduced affinity for proteins, in comparison with a reference sample (Sanitech Ultra) completely devoid of amphiphilic copolymer.

The adsorption of proteins is found to be reduced in all cases by more than 80%, and in the majority of cases by more than 90%, indeed even by more than 95%. As will be shown below in the examples, surprisingly, this reduction in the adsorption does not appear to be proportional to the hydrophilic nature of the surface.

Finally, a subject-matter of the present invention is a device including at least one piece made of silicone as described above. This device, such as an electrical device, is designed so that, during operation of the device, the surface of the said piece made of silicone comes into contact with aqueous liquids including proteins, microorganisms or substances which promote the growth of microorganisms.

The device is advantageously an electrical device for sampling, pumping, conveying and/or dispensing liquids, designed so that, during operation of the device, the surface of the said piece made of silicone comes into contact with aqueous liquids comprising proteins, microorganisms or substances which promote the growth of microorganisms.

In an exemplary embodiment, the device is a beverage dispensing machine, dispensing hot or cold beverages.

In another exemplary embodiment, the device is a coffee machine in which the piece made of silicone is liable to come into contact with an aqueous liquid comprising proteins, such as with milk.

Items:

Item 1. Process for the production of a piece made of silicone comprising: the blending of 100 parts by weight of an HCR silicone base having a viscosity of greater than 106 mPa·s with from 0.3 to 7 parts by weight, such as from 0.5 to 5 parts by weight, or even from 2 to 5 parts by weight of an amphiphilic copolymer comprising hydrophobic polydiorganosiloxane blocks and hydrophilic poly(ethylene oxide), poly(propylene oxide) or ethylene oxide and propylene oxide copolymer blocks, until a homogeneous blend of HCR base and amphiphilic copolymer is obtained, the shaping of the homogeneous blend obtained, and the curing of the shaped blend.

Item 2. Process according to Item 1, characterized in that the curing is carried out by heating at a temperature of between 120° C. and 225° C., such as between 150° C. and 200° C., by irradiation with an appropriate electromagnetic radiation, or combination thereof.

Item 3. Process according to Item 1 or 2, characterized in that the HCR silicone base is: a two-component base comprising a polydimethylsiloxane having vinyl groups (VMQ), a crosslinking agent having hydrosilyl groups and platinum as catalyst.

Item 4. Process according to any one of the preceding items, characterized in that the amphiphilic copolymer comprises, in its polydiorganosiloxane part, reactive groups capable of reacting with the HCR silicone base, wherein the reactive groups comprise vinyl, silanol, alkoxysilyl, hydrosilyl groups, or combination thereof.

Item 5. Process according to any one of the preceding items, characterized in that stage (b) is a stage of extrusion or comprises a stage of extrusion of a profiled element, wherein the profiled element comprises a tube.

Item 6. Process according to any one of the preceding items, characterized in that stage (b) is a stage of coextrusion of the homogeneous blend obtained with at least one other composition of a thermoplastic or thermosetting organic polymer.

Item 7. Process according to Item 6, characterized in that the coextruded organic polymer is an elastomer, wherein the elastomer comprises a heat-curable silicone base (HCR) devoid of amphiphilic copolymer.

Item 8. Process according to any one of the preceding items, characterized in that the amphiphilic copolymer is chosen from the group formed by triblock copolymers of A-B-A structure where each A represents a poly(ethylene oxide) block and B represents a PDMS block, grafted copolymers comprising a single PDMS block to which several poly(ethylene oxide) blocks are grafted, and copolymers formed of a PDMS block comprising from 3 to 8 dimethylsiloxane units to which a single poly(ethylene oxide) block is grafted.

Item 9. Piece made of cured silicone, obtainable by the process according to any one of the preceding items.

Item 10. Piece made of silicone according to Item 9, characterized in that it is a tube.

Item 11. Device comprising at least one piece made of silicone according to Item 9 or 10, designed so that, during operation of the device, the surface of the said piece made of silicone comes into contact with aqueous liquids comprising proteins, microorganisms or substances which promote the growth of microorganisms.

Item 12. Device according to Item 11, characterized in that the device is an electrical device for sampling, pumping, conveying and/or dispensing liquids, designed so that, during operation of the device, the surface of the said piece made of silicone comes into contact with aqueous liquids comprising proteins, microorganisms or substances which promote the growth of microorganisms.

Item 13. Device according to Item 12, characterized in that the device is a beverage dispensing machine, preferably a coffee machine, and in that the piece made of silicone is liable to come into contact with an aqueous liquid comprising proteins, such as with milk.

EXAMPLE

The two components of a two-component HCR base for Sanitech Ultra (platinum-catalyzed base) are mixed for 5 minutes using an open mill, amphiphilic copolymer (A to I) is subsequently added in the amounts specified below (1% or 3%, with respect to the weight of the elastomer base) and mixing is again carried out for 5 minutes.

The homogeneous blend thus obtained is extruded in the form of a continuous tube exhibiting an internal diameter of 6.4 mm and an external diameter of 9.6 mm. The extrudate is heated immediately after the die outlet at 165° C. for approximately one minute and is cut up into sections with a length of 22 cm which are again heated in a thermostatically-controlled oven at a temperature of 165° C. or 200° C. for 2 hours.

The contact angle with water of each material is determined on a flat sample, prepared separately by moulding, according to the sessile drop method. The values shown in the table below are those read after 300 seconds.

In order to evaluate the affinity of the surfaces for proteins, a mixture (70/30) of milk and hard water (20 dH) heated to 85° C. is intermittently passed through the tubes over 8 hours (30 seconds of milk flow alternating with 2.5 minutes of air). At the end of this period, the internal face of the tubes is not rinsed but only freed from possible residual drops with a jet of air. The adsorbed proteins are detached by ultrasound (5 cm of tube in 10 ml of water) and then quantitatively determined in the aqueous supernatant according to the Bradford test.

The PDMS-PEG amphiphilic copolymers tested are as follows:

A: Di-1010 (Siltech)—ABA block copolymer, $M_w$=1800 g/mol, viscosity of approximately 20 mPa·s B: CR 1115 (Siltech)—ABA block copolymer, viscosity of approximately 5000 mPa·s C: Di-5018-F (Siltech)—ABA block copolymer, $M_w$=6200 g/mol, viscosity of approximately 12000 mPa·s D: HJ2-708 (Siltech)—PEG-grafted PDMS—viscosity of approximately 1800 mPa·s, E: Coat-O-Sil 7608 (Momentive)—tri(dimethylsiloxane) with a hydrophilic tail comprising from 6 to 9 ethylene oxide units F: Coat-O-Sil 7602 (Momentive)—PEG-grafted PDMS—$M_w$=3000 g/mol, viscosity of approximately 100 mPa·s G: Coat-O-Sil 77 (Momentive)—tri(dimethylsiloxane) with a hydrophilic tail comprising from 6 to 9 ethylene oxide units and a methoxy ending H: 500 W Additive (Dow Corning)—tri(dimethylsiloxane) with a hydrophilic tail comprising from 6 to 9 ethylene oxide units and an acetyl ending I SiH6185.0 (Gelest)—tri(dimethylsiloxane) with a hydrophilic tail comprising from 6 to 9 ethylene oxide units The contact angle measured by the sessile drop method (300 s) on a flat sample and the amounts of protein adsorbed after 8 hours, in comparison with a Sanitech Ultra 50 tube (control) prepared without addition of hydrophilic copolymer, are shown in the table below.

|  | Amount of amphiphilic co-polymer | Post-curing temperature | Contact angle measured at 300 s | Amount of protein adsorbed (μg/tube) | Reduction in the amount adsorbed |
|---|---|---|---|---|---|
| Control | — | — | 105 | 735 | — |
| A | 3% | 165° C. | 71 | 145 | 80% |
| B | 3% | 165° C. | 92 | 13.2 | 98% |
| C | 3% | 165° C. | 92 | 13.2 | 98% |
| D | 3% | 165° C. | 87 | 39.6 | 95% |
| E | 3% | 165° C. | 67 | 22 | 97% |

-continued

| | Amount of amphiphilic co-polymer | Post-curing temperature | Contact angle measured at 300 s | Amount of protein adsorbed (µg/tube) | Reduction in the amount adsorbed |
|---|---|---|---|---|---|
| F | 3% | 165° C. | 50 | 22 | 97% |
| G | 3% | 165° C. | 79 | 57.2 | 92% |
| H | 3% | 165° C. | 23 | 57.2 | 92% |
| I | 3% | 165° C. | 15 | 22 | 97% |
| D | 3% | 200° C. | 90 | 13.2 | 98% |
| G | 3% | 200° C. | 73 | 26.4 | 96% |
| C | 3% | 200° C. | 79 | 26.4 | 96% |
| I | 3% | 200° C. | 69 | 83.6 | 89% |
| G | 1% | 200° C. | 98 | 206.8 | 72% |
| C | 1% | 200° C. | 98 | 149.6 | 79% |
| I | 1% | 200° C. | 95 | 220 | 70% |
| C | 2.5% | 200° C. | 99 | 37 | 95% |

These examples show that the incorporation of small amounts of PDMS-PEG amphiphilic copolymers in HCRs effectively reduces the adsorption of proteins on the walls of the silicone tubes and does so independently of the contact angle determined according to the sessile drop method. The effect at 1% of amphiphilic copolymer (reduction of approximately 70-80% in the amount of protein adsorbed) is smaller than at 3% (reduction of 90% and more in the amount of protein adsorbed). A postcuring at 200° C. for 2 hours does not detrimentally influence the effect observed, which indicates the absence of thermal decomposition of the amphiphilic copolymers incorporated.

The invention claimed is:

1. A process for the production of a piece made of silicone comprising:
   (a) blending of 100 parts by weight of an HCR silicone base having a viscosity of greater than $10^6$ mPa·s with from 0.3 to 7 parts by weight of an amphiphilic copolymer comprising hydrophobic polydiorganosiloxane blocks and hydrophilic poly(ethylene oxide), poly(propylene oxide) or ethylene oxide and propylene oxide copolymer blocks, characterized in that the amphiphilic copolymer comprises, in its polydiorganosiloxane part, reactive groups capable of reacting with the HCR silicone base, wherein the reactive groups comprise vinyl, silanol, alkoxysilyl, hydrosilyl groups, or combination thereof, until a homogeneous blend of HCR base and amphiphilic copolymer is obtained,
   (b) shaping of the homogeneous blend obtained, and
   (c) curing of the shaped blend.

2. The process according to claim 1, characterized in that the curing is carried out by heating at a temperature of between 120° C. and 225° C. by irradiation with an appropriate electromagnetic radiation, or combination thereof.

3. The process according to claim 1, characterized in that the HCR silicone base is:
   a two-component base comprising a polydimethylsiloxane having vinyl groups (VMQ), a crosslinking agent having hydrosilyl groups and platinum as catalyst.

4. The process according to claim 1, characterized in that stage (b) is a stage of extrusion or comprises a stage of extrusion of a profiled element, wherein the profiled element comprises a tube.

5. The process according to claim 1, characterized in that the amphiphilic copolymer is chosen from the group formed by triblock copolymers of A-B-A structure where each A represents a poly(ethylene oxide) block and B represents a PDMS block, grafted copolymers comprising a single PDMS block to which several poly(ethylene oxide) blocks are grafted, and copolymers formed of a PDMS block comprising from 3 to 8 dimethylsiloxane units to which a single poly(ethylene oxide) block is grafted.

6. The process according to claim 1, characterized in that stage (b) is a stage of coextrusion of the homogeneous blend obtained with at least one other composition of a thermoplastic or thermosetting organic polymer.

7. The process according to claim 6, characterized in that the coextruded organic polymer is an elastomer, wherein the elastomer comprises a heat-curable silicone base (HCR) devoid of amphiphilic copolymer.

8. A piece made of cured silicone comprising:
   100 parts by weight of an HCR silicone base having a viscosity of greater than $10^6$ mPa·s;
   0.3 to 7 parts by weight of an amphiphilic copolymer comprising hydrophobic polydiorganosiloxane blocks and hydrophilic poly(ethylene oxide), poly(propylene oxide) or ethylene oxide and propylene oxide copolymer blocks to provide a homogeneous blend of the HCR base and the amphiphilic copolymer, characterized in that the amphiphilic copolymer comprises, in its polydiorganosiloxane part, reactive groups capable of reacting with the HCR silicone base, wherein the reactive groups comprise vinyl, silanol, alkoxysilyl, hydrosilyl groups, or combination thereof.

9. The piece made of silicone according to claim 8, characterized in that it is a tube.

10. The piece made of silicone according to claim 8, characterized in that the HCR silicone base is:
    a two-component base comprising a polydimethylsiloxane having vinyl groups (VMQ), a crosslinking agent having hydrosilyl groups and platinum as catalyst.

11. The piece made of silicone according to claim 8, characterized in that the amphiphilic copolymer is chosen from the group formed by triblock copolymers of A-B-A structure where each A represents a poly(ethylene oxide) block and B represents a PDMS block, grafted copolymers comprising a single PDMS block to which several poly(ethylene oxide) blocks are grafted, and copolymers formed of a PDMS block comprising from 3 to 8 dimethylsiloxane units to which a single poly(ethylene oxide) block is grafted.

12. The piece made of silicone according to claim 8, having reduced protein adsorption of more that 70% compared to an identical material devoid of the amphiphilic copolymer.

13. A device comprising at least one piece made of silicone comprising:
    100 parts by weight of an HCR silicone base having a viscosity of greater than $10^6$ mPa·s;
    0.3 to 7 parts by weight of an amphiphilic copolymer comprising hydrophobic polydiorganosiloxane blocks and hydrophilic poly(ethylene oxide), poly(propylene oxide) or ethylene oxide and propylene oxide copolymer blocks to provide a homogeneous blend of the HCR base and the amphiphilic copolymer, characterized in that the amphiphilic copolymer comprises, in its polydiorganosiloxane part, reactive groups capable of reacting with the HCR silicone base, wherein the reactive groups comprise vinyl, silanol, alkoxysilyl, hydrosilyl groups, or combination thereof;
    wherein the at least one piece made of silicone is designed so that, during operation of the device, the surface of the said piece made of silicone comes into contact with aqueous liquids comprising proteins, microorganisms or substances which promote the growth of microorganisms.

14. The device according to claim 13, characterized in that the HCR silicone base is:
- a two-component base comprising a polydimethylsiloxane having vinyl groups (VMQ), a crosslinking agent having hydrosilyl groups and platinum as catalyst.

15. The device according to claim 13, characterized in that the amphiphilic copolymer is chosen from the group formed by triblock copolymers of A-B-A structure where each A represents a poly(ethylene oxide) block and B represents a PDMS block, grafted copolymers comprising a single PDMS block to which several poly(ethylene oxide) blocks are grafted, and copolymers formed of a PDMS block comprising from 3 to 8 dimethylsiloxane units to which a single poly(ethylene oxide) block is grafted.

16. The device according to claim 13, characterized in that the device is an electrical device for sampling, pumping, conveying and/or dispensing liquids, designed so that, during operation of the device, the surface of the said piece made of silicone comes into contact with aqueous liquids comprising proteins, microorganisms or substances which promote the growth of microorganisms.

17. The device according to claim 13, characterized in that the device is a beverage dispensing machine and in that the piece made of silicone is liable to come into contact with an aqueous liquid comprising proteins.

* * * * *